United States Patent [19]
Jang et al.

[11] Patent Number: 5,579,059
[45] Date of Patent: Nov. 26, 1996

[54] MOTION VECTOR ESTIMATOR

[75] Inventors: Soon H. Jang; Yong S. Moon, both of Seoul, Rep. of Korea

[73] Assignee: Korea Telecommunication Authority, Rep. of Korea

[21] Appl. No.: 493,792

[22] Filed: Jun. 22, 1995

[30] Foreign Application Priority Data

Jun. 24, 1994 [KR] Rep. of Korea ......................... 94-14584

[51] Int. Cl.$^6$ .............................. H04N 7/28; H04N 7/32
[52] U.S. Cl. ............................. 348/699; 348/700
[58] Field of Search ........................... 348/402, 407, 348/413, 416, 699, 700, 701

[56] References Cited

U.S. PATENT DOCUMENTS

| | | | |
|---|---|---|---|
| 4,730,217 | 3/1988 | Tonge et al. ........................... | 348/700 |
| 5,142,360 | 8/1992 | Niihara .................................. | 348/699 |
| 5,173,865 | 12/1992 | Koike et al. ........................... | 348/699 |
| 5,212,548 | 5/1993 | de Haan et al. ....................... | 348/699 |
| 5,406,501 | 4/1995 | Florent .................................. | 348/699 |
| 5,448,310 | 9/1995 | Kopet et al. ........................... | 348/699 |
| 5,477,272 | 12/1995 | Zhang et al. .......................... | 348/699 |
| 5,497,203 | 3/1996 | Kayashima et al. ................... | 348/699 |

*Primary Examiner*—Tommy P. Chin
*Assistant Examiner*—Frank Snow
*Attorney, Agent, or Firm*—Merchant, Gould, Smith, Edell, Welter & Schmidt

[57] ABSTRACT

An improved motion vector extractor comprising a first pixel delay element for delaying pixel data of the previous frame by a one pixel interval, a second pixel delay element for delaying the pixel data of the previous frame by a horizontal line interval of a seek block, a third pixel delay element for delaying the pixel data of the previous frame by a seek block horizontal line and one pixel interval, an interpolation circuit for combining the pixel data of the previous frame and the delayed pixel data of the previous frame from the first to third pixel delay elements to produce at least one interpolation pixel data positioned between adjacent ones thereof, a fourth pixel delay element for delaying pixel data of the present frame to produce rectangularly arranged pixel data of the present frame, a plurality of MAD detectors, each of the plurality of MAD detectors subtracting a corresponding one of the interpolation pixel data from the interpolation circuit from a corresponding one of the rectangularly arranged pixel data of the present frame from the fourth pixel delay element to produce an MAD with respect to the corresponding pixel data of the present frame, and a comparator for comparing the MADs from the plurality of MAD detectors with one another and extracting a motion vector in accordance with the compared result.

1 Claim, 9 Drawing Sheets

| t | Input Data | IP1 output | IP2 outputs | PE0 | PE1 | PE2 | PE3 |
|---|---|---|---|---|---|---|---|
| 0 | b(0,0) b(1,0) | $b^0{}_0(0,0)$ | | | | | |
| 1 | | $b^1{}_0(0,0)$ | | | | | |
| 2 | | $b^2{}_0(0,0)$ | | | | | |
| 3 | | $b^3{}_0(0,0)$ | | | | | |
| 4 | b(0,1) b(1,1) | $b^0{}_0(0,1)$ | | | | | |
| 5 | | $b^1{}_0(0,1)$ | $b^0{}_0(0,0), b^0{}_1(0,0), b^0{}_2(0,0), b^0{}_3(0,0)$ | | | | |
| 6 | | $b^2{}_0(0,1)$ | $b^1{}_0(0,0), b^1{}_1(0,0), b^1{}_2(0,0), b^1{}_3(0,0)$ | $a(0,0)-b^0{}_0(0,0)$ | $a(0,0)-b^0{}_1(0,0)$ | $a(0,0)-b^0{}_2(0,0)$ | $a(0,0)-b^0{}_3(0,0)$ |
| 7 | | $b^3{}_0(0,1)$ | $b^2{}_0(0,0), b^2{}_1(0,0), b^2{}_2(0,0), b^2{}_3(0,0)$ | $a(0,0)-b^1{}_0(0,0)$ | $a(0,0)-b^1{}_1(0,0)$ | $a(0,0)-b^1{}_2(0,0)$ | $a(0,0)-b^1{}_3(0,0)$ |
| 8 | b(0,2) b(1,2) | $b^0{}_0(0,2)$ | $b^3{}_0(0,0), b^3{}_1(0,0), b^3{}_2(0,0), b^3{}_3(0,0)$ | $a(0,0)-b^2{}_0(0,0)$ | $a(0,0)-b^2{}_1(0,0)$ | $a(0,0)-b^2{}_2(0,0)$ | $a(0,0)-b^2{}_3(0,0)$ |
| 9 | | $b^1{}_0(0,2)$ | $b^0{}_0(0,1), b^0{}_1(0,1), b^0{}_2(0,1), b^0{}_3(0,1)$ | $a(0,0)-b^3{}_0(0,0)$ | $a(0,0)-b^3{}_1(0,0)$ | $a(0,0)-b^3{}_2(0,0)$ | $a(0,0)-b^3{}_3(0,0)$ |
| 10 | | $b^2{}_0(0,2)$ | $b^1{}_0(0,1), b^1{}_1(0,1), b^1{}_2(0,1), b^1{}_3(0,1)$ | $a(0,1)-b^0{}_0(0,1)$ | $a(0,1)-b^0{}_1(0,1)$ | $a(0,1)-b^0{}_2(0,1)$ | $a(0,1)-b^0{}_3(0,1)$ |
| 11 | | $b^3{}_0(0,2)$ | $b^2{}_0(0,1), b^2{}_1(0,1), b^2{}_2(0,1), b^2{}_3(0,1)$ | $a(0,1)-b^1{}_0(0,1)$ | $a(0,1)-b^1{}_1(0,1)$ | $a(0,1)-b^1{}_2(0,1)$ | $a(0,1)-b^1{}_3(0,1)$ |
| 12 | b(0,3) b(1,3) | $b^0{}_0(0,3)$ | $b^3{}_0(0,1), b^3{}_1(0,1), b^3{}_2(0,1), b^3{}_3(0,1)$ | $a(0,1)-b^2{}_0(0,1)$ | $a(0,1)-b^2{}_1(0,1)$ | $a(0,1)-b^2{}_2(0,1)$ | $a(0,1)-b^2{}_3(0,1)$ |
| 13 | | $b^1{}_0(0,3)$ | $b^0{}_0(0,2), b^0{}_1(0,2), b^0{}_2(0,2), b^0{}_3(0,2)$ | $a(0,1)-b^3{}_0(0,1)$ | $a(0,1)-b^3{}_1(0,1)$ | $a(0,1)-b^3{}_2(0,1)$ | $a(0,1)-b^3{}_3(0,1)$ |
| 14 | | $b^2{}_0(0,3)$ | $b^1{}_0(0,2), b^1{}_1(0,2), b^1{}_2(0,2), b^1{}_3(0,2)$ | $a(0,2)-b^0{}_0(0,2)$ | $a(0,2)-b^0{}_1(0,2)$ | $a(0,2)-b^0{}_2(0,2)$ | $a(0,2)-b^0{}_3(0,2)$ |
| 15 | | $b^3{}_0(0,3)$ | $b^2{}_0(0,2), b^2{}_1(0,2), b^2{}_2(0,2), b^2{}_3(0,2)$ | $a(0,2)-b^1{}_0(0,2)$ | $a(0,2)-b^1{}_1(0,2)$ | $a(0,2)-b^1{}_2(0,2)$ | $a(0,2)-b^1{}_3(0,2)$ |
| 16 | b(0,4) b(1,4) | $b^0{}_0(0,4)$ | $b^3{}_0(0,2), b^3{}_1(0,2), b^3{}_2(0,2), b^3{}_3(0,2)$ | $a(0,2)-b^2{}_0(0,2)$ | $a(0,2)-b^2{}_1(0,2)$ | $a(0,2)-b^2{}_2(0,2)$ | $a(0,2)-b^2{}_3(0,2)$ |
| ... | | | | $a(0,2)-b^3{}_0(0,2)$ | $a(0,2)-b^3{}_1(0,2)$ | $a(0,2)-b^3{}_2(0,2)$ | $a(0,2)-b^3{}_3(0,2)$ |
| 64 | b(0,16) b(1,16) | $b^3{}_0(0,15)$ | | . | . | . | . |
| 65 | | $b^0{}_0(0,16)$ | $b^0{}_0(0,15), b^0{}_1(0,15), b^0{}_2(0,15), b^0{}_3(0,15)$ | . | . | . | . |
| 66 | | $b^1{}_0(0,16)$ | $b^1{}_0(0,15), b^1{}_1(0,15), b^1{}_2(0,15), b^1{}_3(0,15)$ | $a(0,15)-b^0{}_0(0,15)$ | $a(0,15)-b^0{}_1(0,15)$ | $a(0,15)-b^0{}_2(0,15)$ | $a(0,15)-b^0{}_3(0,15)$ |
| 67 | | $b^2{}_0(0,16)$ | $b^2{}_0(0,15), b^2{}_1(0,15), b^2{}_2(0,15), b^2{}_3(0,15)$ | $a(0,15)-b^1{}_0(0,15)$ | $a(0,15)-b^1{}_1(0,15)$ | $a(0,15)-b^1{}_2(0,15)$ | $a(0,15)-b^1{}_3(0,15)$ |
| 68 | | $b^3{}_0(0,16)$ | $b^3{}_0(0,15), b^3{}_1(0,15), b^3{}_2(0,15), b^3{}_3(0,15)$ | $a(0,15)-b^2{}_0(0,15)$ | $a(0,15)-b^2{}_1(0,15)$ | $a(0,15)-b^2{}_2(0,15)$ | $a(0,15)-b^2{}_3(0,15)$ |
|   |   |   |   | $a(0,15)-b^3{}_0(0,15)$ | $a(0,15)-b^3{}_1(0,15)$ | $a(0,15)-b^3{}_2(0,15)$ | $a(0,15)-b^3{}_3(0,15)$ |

FIG. 5

| t | Input Data | IP Outputs | PE1 | PE2 | PE3 | PE4 | PE5 | PE6 | PE7 | PE8 | PE9 |
|---|---|---|---|---|---|---|---|---|---|---|---|
| 1 | b(-1, -1) | | | | | | | | | | |
| 2 | b(-1, 0) | | | | | | | | | | |
| 3 | b(-1, 1) | | | | | | | | | | |
| 4 | b(-1, 2) | | | | | | | | | | |
| 5 | b(-1, 3) | | | | | | | | | | |
| 6 | b(0, -1) | | | | | | | | | | |
| 7 | b(0, 0) | | | | | | | | | | |
| 8 | b(0, 1) | $b^0_0(0,0)$, $b^0_{-1}(0,0)$, $b^0_0(0,0)$, $b^{-1}_{-1}(0,0)$ | $a(0,0)-b^0_0(0,0)$ | $a(0,0)-b^0_{-1}(0,0)$ | $a(0,0)-b^{-1}_0(0,0)$ | $a(0,0)-b^{-1}_{-1}(0,0)$ | | | | | |
| 9 | b(0, 2) | $b^0_0(0,1)$, $b^0_{-1}(0,1)$, $b^0_0(0,1)$, $b^{-1}_{-1}(0,1)$ | $a(0,1)-b^0_0(0,1)$ | $a(0,1)-b^0_{-1}(0,1)$ | $a(0,1)-b^{-1}_0(0,1)$ | $a(0,1)-b^{-1}_{-1}(0,1)$ | $a(0,0)-b^0_{-1}(0,1)$ | $a(0,0)-b^{-1}_{-1}(0,1)$ | | | |
| 10 | b(0, 3) | $b^0_0(0,2)$, $b^0_{-1}(0,2)$, $b^0_0(0,2)$, $b^{-1}_{-1}(0,2)$ | $a(0,2)-b^0_0(0,2)$ | $a(0,2)-b^0_{-1}(0,2)$ | $a(0,2)-b^{-1}_0(0,2)$ | $a(0,2)-b^{-1}_{-1}(0,2)$ | $a(0,1)-b^0_{-1}(0,2)$ | $a(0,1)-b^{-1}_{-1}(0,2)$ | | | |
| 11 | b(1, -1) | $b^0_0(0,3)$, $b^0_{-1}(0,3)$, $b^0_0(0,3)$, $b^{-1}_{-1}(0,3)$ | | | | | $a(0,2)-b^0_{-1}(0,3)$ | $a(0,2)-b^{-1}_{-1}(0,3)$ | | | |
| 12 | b(1, 0) | $b^0_0(1,0)$, $b^0_{-1}(1,0)$, $b^0_0(1,0)$, $b^{-1}_{-1}(1,0)$ | $a(1,0)-b^0_0(1,0)$ | $a(1,0)-b^0_{-1}(1,0)$ | $a(1,0)-b^{-1}_0(1,0)$ | $a(1,0)-b^{-1}_{-1}(1,0)$ | | | $a(0,0)-b^{-1}_0(1,0)$ | $a(0,0)-b^{-1}_{-1}(1,0)$ | |
| 13 | b(1, 1) | $b^0_0(1,1)$, $b^0_{-1}(1,1)$, $b^0_0(1,1)$, $b^{-1}_{-1}(1,1)$ | $a(1,1)-b^0_0(1,1)$ | $a(1,1)-b^0_{-1}(1,1)$ | $a(1,1)-b^{-1}_0(1,1)$ | $a(1,1)-b^{-1}_{-1}(1,1)$ | $a(1,0)-b^0_{-1}(1,1)$ | $a(1,0)-b^{-1}_{-1}(1,1)$ | $a(0,1)-b^{-1}_0(1,1)$ | $a(0,1)-b^{-1}_{-1}(1,1)$ | $a(0,0)-b^{-1}_{-1}(1,1)$ |
| 14 | b(1, 2) | $b^0_0(1,2)$, $b^0_{-1}(1,2)$, $b^0_0(1,2)$, $b^{-1}_{-1}(1,2)$ | $a(1,2)-b^0_0(1,2)$ | $a(1,2)-b^0_{-1}(1,2)$ | $a(1,2)-b^{-1}_0(1,2)$ | $a(1,2)-b^{-1}_{-1}(1,2)$ | $a(1,1)-b^0_{-1}(1,2)$ | $a(1,1)-b^{-1}_{-1}(1,2)$ | $a(0,2)-b^{-1}_0(1,2)$ | $a(0,2)-b^{-1}_{-1}(1,2)$ | $a(0,1)-b^{-1}_{-1}(1,2)$ |
| 15 | b(1, 3) | $b^0_0(1,3)$, $b^0_{-1}(1,3)$, $b^0_0(1,3)$, $b^{-1}_{-1}(1,3)$ | | | | | $a(1,2)-b^0_{-1}(1,3)$ | $a(1,2)-b^{-1}_{-1}(1,3)$ | | | $a(0,2)-b^{-1}_{-1}(1,3)$ |
| 16 | b(2, -1) | | | | | | | | | | |
| 17 | b(2, 0) | $b^0_0(2,0)$, $b^0_{-1}(2,0)$, $b^0_0(2,0)$, $b^{-1}_{-1}(2,0)$ | $a(2,0)-b^0_0(2,0)$ | $a(2,0)-b^0_{-1}(2,0)$ | $a(2,0)-b^{-1}_0(2,0)$ | $a(2,0)-b^{-1}_{-1}(2,0)$ | | | $a(1,0)-b^{-1}_0(2,0)$ | $a(1,0)-b^{-1}_{-1}(2,0)$ | |
| 18 | b(2, 1) | $b^0_0(2,1)$, $b^0_{-1}(2,1)$, $b^0_0(2,1)$, $b^{-1}_{-1}(2,1)$ | $a(2,1)-b^0_0(2,1)$ | $a(2,1)-b^0_{-1}(2,1)$ | $a(2,1)-b^{-1}_0(2,1)$ | $a(2,1)-b^{-1}_{-1}(2,1)$ | $a(2,0)-b^0_{-1}(2,1)$ | $a(2,0)-b^{-1}_{-1}(2,1)$ | $a(1,1)-b^{-1}_0(2,1)$ | $a(1,1)-b^{-1}_{-1}(2,1)$ | $a(1,0)-b^{-1}_{-1}(2,1)$ |
| 19 | b(2, 2) | $b^0_0(2,2)$, $b^0_{-1}(2,2)$, $b^0_0(2,2)$, $b^{-1}_{-1}(2,2)$ | $a(2,2)-b^0_0(2,2)$ | $a(2,2)-b^0_{-1}(2,2)$ | $a(2,2)-b^{-1}_0(2,2)$ | $a(2,2)-b^{-1}_{-1}(2,2)$ | $a(2,1)-b^0_{-1}(2,2)$ | $a(2,1)-b^{-1}_{-1}(2,2)$ | $a(1,2)-b^{-1}_0(2,2)$ | $a(1,2)-b^{-1}_{-1}(2,2)$ | $a(1,1)-b^{-1}_{-1}(2,2)$ |
| 20 | b(2, 3) | $b^0_0(2,3)$, $b^0_{-1}(2,3)$, $b^0_0(2,3)$, $b^{-1}_{-1}(2,3)$ | | | | | $a(2,2)-b^0_{-1}(2,3)$ | $a(2,2)-b^{-1}_{-1}(2,3)$ | | | $a(1,2)-b^{-1}_{-1}(2,3)$ |
| 21 | b(3, -1) | | | | | | | | | | |
| 22 | b(3, 0) | $b^0_0(3,0)$, $b^0_{-1}(3,0)$, $b^0_0(3,0)$, $b^{-1}_{-1}(3,0)$ | | | | | | | $a(2,0)-b^{-1}_0(3,0)$ | $a(2,0)-b^{-1}_{-1}(3,0)$ | |
| 23 | b(3, 1) | $b^0_0(3,1)$, $b^0_{-1}(3,1)$, $b^0_0(3,1)$, $b^{-1}_{-1}(3,1)$ | | | | | | | $a(2,1)-b^{-1}_0(3,1)$ | $a(2,1)-b^{-1}_{-1}(3,1)$ | $a(2,0)-b^{-1}_{-1}(3,1)$ |
| 24 | b(3, 2) | $b^0_0(3,2)$, $b^0_{-1}(3,2)$, $b^0_0(3,2)$, $b^{-1}_{-1}(3,2)$ | | | | | | | $a(2,2)-b^{-1}_0(3,2)$ | $a(2,2)-b^{-1}_{-1}(3,2)$ | $a(2,1)-b^{-1}_{-1}(3,2)$ |
| 25 | b(3, 3) | $b^0_0(3,3)$, $b^0_{-1}(3,3)$, $b^0_0(3,3)$, $b^{-1}_{-1}(3,3)$ | | | | | | | | | $a(2,2)-b^{-1}_{-1}(3,3)$ |

FIG. 9

MOTION VECTOR ESTIMATOR

BACKGROUND OF THE INVENTION

1. Field of the Invention

The present invention relates in general to an apparatus for compressing video data to transmit moving picture data in real time through a transmission medium with a limited band width, and more particularly to an improved motion vector extractor which is capable of rapidly extracting motion vectors from the moving picture data to be transmitted and simplifying its circuit construction.

2. Description of the Prior Art

Recently, digital video transmission systems have utilized a data compression method to transmit moving picture data in real time through a transmission channel with a limited band width to digital video reception systems such as a digital video phone, a digital video conversation system, a digital television and a high definition television. The data compression method is adapted to compress the moving picture data by removing time and spatial redundancies of the moving picture data. The time redundancy removing methods include motion vector estimation and compensation methods for transmitting only motion vectors regarding a moving object or a part of the moving object to have the actual video data transmission effect. This results from the moving picture data having a series of frames corresponding to the moving object. The motion vector estimation method is generally classified into a recursive method and a matching method. In the matching method, there is widely used a block matching algorithm for matching the moving picture data in the unit of block to estimate the motion vectors from the moving picture data.

The ISO/IEC JTC1/SC29/WG11 recommendation proposed by the moving picture expert group (MPEG) specifies a block matching algorithm which finds the motion vectors in the unit of macro block including 16×16 pixels. This recommendation also suggests that the motion vectors be estimated in the unit of ½ pixel to enhance the accuracy thereof.

On the basis of the above recommendation, the digital video transmission systems comprise a motion vector extractor for extracting a motion vector in a pixel unit smaller than an integer, such as ¼ pixel or ½ pixel, to secure the accuracy of the video data to be transmitted. Such a conventional motion vector extractor produces interpolation pixel data using desired integer pixel data and integer pixel data adjacent up, down, to the left and to the right of the desired integer pixel data. The conventional motion vector extractor calculates a mean absolute difference (referred to hereinafter as "MAD") between the desired integer pixel data and each of the produced interpolation pixel data. Then, the conventional motion vector extractor compares the calculated MADs with one another and calculates the motion vector in accordance with the compared result. In the case of estimating the motion vector in the unit of ¼ pixel, the conventional motion vector extractor must calculate 16 of 49 interpolation pixel data, adjacent to one side of the desired integer pixel data, and the corresponding MADs. In the case of estimating the motion vector in the unit of ½ pixel, the conventional motion vector extractor must calculate 4 of 9 interpolation pixel data, adjacent to one side of the desired integer pixel data, and the corresponding MADs.

However, the above-mentioned conventional motion vector extractor has a disadvantage in that it sequentially calculates one by one the interpolation pixel data related to the desired integer pixel data, resulting in much time being required in calculating the motion vector. Further, the above-mentioned conventional motion vector extractor has another disadvantage in that it must have a complex circuit construction to enhance the motion vector calculating time. The problem with the above-mentioned conventional motion vector extractor will hereinafter be described in detail with reference to FIGS. 1 to 5.

Referring to FIG. 1, there is shown a block diagram of the conventional motion vector extractor for extracting the motion vector in the unit of ¼ pixel. As shown in this drawing, the conventional motion vector extractor comprises a first interpolation circuit 10 for inputting pixel data $b(i,j)$ of the previous frame (referred to hereinafter as "present pixel data") and pixel data $b(i+1,j)$ of the subsequent block line of the pixel data $b(i,j)$ (referred to hereinafter as "subsequent line pixel data") from first and second input lines 11 and 13, respectively. Here, "i" and "j" designate vertical and horizontal coordinates of the pixel data, respectively. The first interpolation circuit 10 obtains four vertical interpolation pixel data $b_0^0(i,j)$, $b_0^1(i,j)$, $b_0^2(i,j)$ and $b_0^3(i,j)$ with respect to the pixel data $b(i,j)$ of the previous frame using the pixel data $b(i,j)$ of the previous frame and the subsequent line pixel data $b(i+1,j)$. Then, the first interpolation circuit 10 sequentially supplies the obtained vertical interpolation pixel data $b_0^0(i,j)$, $b_0^1(i,j)$, $b_0^2(i,j)$ and $b_0^3(i,j)$ to a first register 12. The first register 12 sequentially supplies the vertical interpolation pixel data $b_0^0(i,j)$, $b_0^1(i,j)$, $b_0^2(i,j)$ and $b_0^3(i,j)$ from the first interpolation circuit 10 to a second interpolation circuit 22 and a second register 14. The second to fifth registers 14, 16, 18 and 20 are connected in series to the first register 12 to delay the vertical interpolation pixel data $b_0^0(i,j)$, $b_0^1(i,j)$, $b_0^2(i,j)$ and $b_0^3(i,j)$ from the first register 12 by a one pixel interval, respectively. As a result, the fifth register 20 sequentially supplies the vertical interpolation pixel data $b_0^0(i,j)$, $b_0^1(i,j)$, $b_0^2(i,j)$ and $b_0^3(i,j)$ regarding the present pixel data to the second interpolation circuit 22, whereas the first register 12 sequentially supplies vertical interpolation pixel data $b_0^0(i,j+1)$, $b_0^1(i,j+1)$, $b_0^2(i,j+1)$ and $b_0^3(i,j+1)$ regarding the subsequent pixel data to the second interpolation circuit 22. The second interpolation circuit 22 combines the vertical interpolation pixel data $b_0^0(i,j)$, $b_0^1(i,j)$, $b_0^2(i,j)$ and $b_0^3(i,j)$ regarding the present pixel data, supplied from the fifth register 20, and the vertical interpolation pixel data $b_0^0(i,j+1)$, $b_0^1(i,j+1)$, $b_0^2(i,j+1)$ and $b_0^3(i,j+1)$ regarding the subsequent pixel data, supplied from the first register 12. As a result of the combination, the second interpolation circuit 22 obtains four horizontal interpolation pixel data $b_0^k(i,j)$, $b_1^k(i,j)$, $b_2^k(i,j)$ and $b_3^k(i,j)$ with respect to each of the vertical interpolation pixel data $b_0^0(i,j)$, $b_0^1(i,j)$, $b_0^2(i,j)$ and $b_0^3(i,j)$.

The conventional motion vector extractor further comprises first to fourth MAD detectors 24, 26, 28 and 30 for inputting pixel data $a(i,j)$ of the present frame from a third input line 15. The first MAD detector 24 sequentially obtains four MADs in the vertical direction on the basis of the pixel data $a(i,j)$ of the present frame from the third input line 15 and the horizontal interpolation pixel data $b_0^k(i,j)$ from the second interpolation circuit 22. Then, the first MAD detector 24 sequentially supplies the obtained four MADs to a comparator 32. Similarly, each of the second to fourth MAD detectors 26, 28 and 30 obtains four MADs in the vertical direction on the basis of the pixel data $a(i,j)$ of the present frame from the third input line 15 and a corresponding one of the horizontal interpolation pixel data $b_1^k(i,j)$, $b_2^k(i,j)$ and $b_3^k(i,j)$ from the second interpolation circuit 22 and then supplies the obtained four MADs to the comparator 32. The comparator 32 compares the MADs from the first to fourth MAD detectors 24, 26, 28 and 30 with one another and detects the motion vector in accordance with the compared result. The second interpolation circuit 22, the first to fourth MAD detectors 24, 26, 28 and 30 and the comparator 32 are operated four times to extract the motion vector regarding one pixel at output line 17.

The first and second interpolation circuits 10 and 22 are operated four times to produce 16 interpolation pixel data on the basis of the following equation (1):

$$b_1^k(i,j)=(4-l)/4\{(4-k)b(i,j)/4+kb(i+1,j)/4\}+l/4\{(4-k)b(i,j+1)/4+kb(i+1,j+1)/4\} \quad (1)$$

Referring to FIG. 2, there is shown a detailed block diagram of the first interpolation circuit 10 in FIG. 1. As shown in this drawing, the first interpolation circuit 10 includes a first attenuator 34 for inputting the pixel data b(i,j) of the previous frame from the first input line 11, and a second attenuator 36 for inputting the subsequent line pixel data b(i+1,j) from the second input line 13. The second attenuator 36 attenuates the subsequent line pixel data b(i+1,j) from the second input line 13 in such a manner that it can have a ¼ amplitude. Then, the second attenuator 36 supplies the attenuated subsequent line pixel data b(i+1,j)/4 to a first adder 38. The first adder 38 adds pixel data from a first subtracter 44 to the attenuated subsequent line pixel data b(i+1,j)/4 from the second attenuator 36. As a result of the addition, the first adder 38 obtains the vertical interpolation pixel data $b_0^k(i,j)$. The first adder 38 then supplies the obtained vertical interpolation pixel data $b_0^k(i,j)$ to a multiplexer 40. The multiplexer 40 selectively transfers the vertical interpolation pixel data $b_0^k(i,j)$ from the first adder 38 and the pixel data b(i,j) of the previous frame from the first input line 11 through an output line 35 to the first register 12 in FIG. 1. Namely, at the initial state, the multiplexer 40 transfers the pixel data b(i,j) of the previous frame from the first input line 11 as the vertical interpolation pixel data $b_0^k(i,j)$ through the output line 35 to the first register 12. At the normal state, the multiplexer 40 transfers the vertical interpolation pixel data $b_0^k(i,j)$ from the first adder 38 through the output line 35 to the first register 12.

The first interpolation circuit 10 further includes a sixth register 42 for inputting the vertical interpolation pixel data $b_0^k(i,j)$ selected by the multiplexer 40 through the output line 35. The sixth register 42 delays the vertical interpolation pixel data $b_0^k(i,j)$ from the multiplexer 40 for a predetermined time period and supplies the delayed vertical interpolation pixel data $b_0^k(i,j)$ to the first subtracter 44. The first attenuator 34 attenuates the pixel data b(i,j) of the previous frame from the first input line 11 in such a manner that it can have a ¼ amplitude. Then, the first attenuator 34 supplies the attenuated pixel data b(i,j)/4 of the previous frame to the first subtracter 44. The first subtracter 44 subtracts the attenuated pixel data b(i,j)/4 of the previous frame from the first attenuator 34 from the delayed vertical interpolation pixel data $b_0^k(i,j)$ from the sixth register 42 and supplies the resultant pixel data to the first adder 38.

In result, the first interpolation circuit 10 produces the four vertical interpolation pixel data on the basis of the following equation (2):

$$b_0^k(i,j)=b_0^{k-1}(i,j)-b_0(i,j)/4+b_0(i,j+1)/4 \quad (2)$$

Referring to FIG. 3, there is shown a detailed block diagram of the second interpolation circuit 22 in FIG. 1. As shown in this drawing, the second interpolation circuit 22 includes a third attenuator 46 for inputting the vertical interpolation pixel data $b_0^k(i,j+1)$ of the subsequent pixel data from the first register 12 in FIG. 1 through a first input line 47, and a fourth attenuator 48 for inputting the vertical interpolation pixel data $b_0^k(i,j)$ of the present pixel data from the fifth register 20 in FIG. 1 through a second input line 49. The third attenuator 46 attenuates the vertical interpolation pixel data $b_0^k(i,j+1)$ of the subsequent pixel data from the first register 12 in such a manner that it can have a ½ amplitude. Then, the third attenuator 46 supplies the attenuated vertical interpolation pixel data $b_0^k(i,j+1)/2$ of the subsequent pixel data to second and fourth adders 50 and 56. The fourth attenuator 48 attenuates the vertical interpolation pixel data $b_0^k(i,j)$ of the present pixel data from the fifth register 20 in such a manner that it can have a ½ amplitude. Then, the fourth attenuator 48 supplies the attenuated vertical interpolation pixel data $b_0^k(i,j)/2$ of the present pixel data to the second adder 50 and a third adder 54. The second adder 50 adds the attenuated vertical interpolation pixel data $b_0^k(i,j+1)/2$ and $b_0^k(i,j)/2$ from the third and fourth attenuators 46 and 48. As a result of the addition, the second adder 50 produces the horizontal interpolation pixel data $b_2^k(i,j)$.

The second interpolation circuit 22 further includes a fifth attenuator 52 for attenuating the horizontal interpolation pixel data $\{[b_0^k(i,j+1)+b_0^k(i,j)]/2=b_2^k(i,j)\}$ from the second adder 50 in such a manner that it can have a ½ amplitude. The fifth attenuator 52 supplies the attenuated horizontal interpolation pixel data $[b_0^k(i,j+1)+b_0^k(i,j)]/4$ to the third and fourth adders 54 and 56. The third adder 54 adds the attenuated vertical interpolation pixel data $b_0^k(i,j)/2$ from the fourth attenuator 48 and the attenuated horizontal interpolation pixel data $[b_0^k(i,j+1)+b_0^k(i,j)]/4$ from the fifth attenuator 52. As a result of the addition, the third adder 54 produces the horizontal interpolation pixel data $b_1^k(i,j)$. The fourth adder 56 adds the attenuated vertical interpolation pixel data $b_0^k(i,j+1)/2$ from the third attenuator 46 and the attenuated horizontal interpolation pixel data $[b_0^k(i,j+1)+b_0^k(i,j)]/4$ from the fifth attenuator 52. As a result of the addition, the fourth adder 56 produces the horizontal interpolation pixel data $\{b_3^k(i,j)=[3b_0^k(i,j+1)+b_0^k(i,j)]/4\}$.

The second interpolation circuit 22 further includes first to third output lines 51, 53 and 55 connected respectively to the third, second and fourth adders 54, 50 and 56. The second input line 49 transfers the vertical interpolation pixel data $b_0^k(i,j)$ of the present pixel data from the fifth register 20 as the horizontal interpolation pixel data to the first MAD detector 24 in FIG. 1. The first to third output lines 51, 53 and 55 transfer the horizontal interpolation pixel data $b_1^k(i,j)$, $b_2^k(i,j)$ and $b_3^k(i,j)$ from the third, second and fourth adders 54, 50 and 56 to the second to fourth MAD detectors 26, 28 and 30 in FIG. 1, respectively.

Referring to FIG. 4, there is shown a detailed block diagram of each of the first to fourth MAD detectors 24, 26, 28 and 30 in FIG. 1. As shown in this drawing, the MAD detector includes a second subtracter 58 for inputting the pixel data a(i,j) of the present frame and the horizontal interpolation pixel data $b_1^k(i,j)$ regarding the present pixel data through first and second input lines 15 and 59, respectively. The second subtracter 58 subtracts the horizontal interpolation pixel data $b_1^k(i,j)$ regarding the present pixel data from the pixel data a(i,j) of the present frame. As a result of the subtraction, the second subtracter 58 detects a difference between the pixel data a(i,j) of the present frame and the horizontal interpolation pixel data $b_1^k(i,j)$ regarding the present pixel data. Then, the second subtracter 58 supplies the detected difference to a seventh register 60. The first input line 15 is the same as the third input line 15 in FIG.

1. The second input line 59 is connected to the second input line 49, the first output line 51, the second output line 53 or the third output line 55 of the second interpolation circuit 22 in FIG. 1 to input the corresponding horizontal interpolation pixel data $b_0^k(i,j)$, $b_1^k(i,j)$, $b_2^k(i,j)$ or $b_3^k(i,j)$ therefrom. The seventh register 60 temporarily stores the inter-pixel difference from the second subtracter 58 and supplies the temporarily stored inter-pixel difference to an absolute value calculator 62. In result, the seventh register 60 acts to safely transfer the inter-pixel difference from the second subtracter 58 to the absolute value calculator 62. The absolute value calculator 62 obtains an absolute value of the inter-pixel difference from the seventh register 60 and supplies the obtained absolute value to an eighth register 64.

The MAD detector further includes an accumulator 66 for inputting the absolute value of the inter-pixel difference from the eighth register 64. The accumulator 66 adds the absolute value of the inter-pixel difference from the eighth register 64 to an MAD from an output line 61 and transfers the resultant MAD to a ninth register 68. The ninth register 68 transfers the MAD from the accumulator 66 to the output line 61 through tenth to twelfth registers 70, 72 and 74. The ninth to twelfth registers 68, 70, 72 and 74 are connected between the accumulator 66 and the output line 61 to store the four MADs produced between the four vertical interpolation pixel data and the pixel data of the present frame, respectively.

FIG. 5 is a table illustrating the interpolation pixel data from the first and second interpolation circuits 10 and 22 and the MADs from the first to fourth MAD detectors 24, 26, 28 and 30 with respect to the pixel data from the second input line 13 in FIG. 1.

As mentioned above, the conventional motion vector extractor must perform the same operation four times to extract the motion vector with respect to one pixel, resulting in a significant reduction in the motion vector calculating speed. In order to enhance the motion vector calculating speed, the conventional motion vector extractor may perform the interpolation pixel data and MAD detections in a parallel manner. In this case, the circuit becomes very complex in construction.

SUMMARY OF THE INVENTION

Therefore, the present invention has been made in view of the above problem, and it is an object of the present invention to provide an improved motion vector extractor which is capable of rapidly obtaining motion vectors and simplifying its circuit construction.

In accordance with the present invention, the above and other objects can be accomplished by providing an improved motion vector extractor comprising first pixel delay means for delaying pixel data of the previous frame by a one pixel interval; second pixel delay means for delaying the pixel data of the previous frame by a horizontal line interval of a seek block; third pixel delay means for delaying the pixel data of the previous frame by a seek block horizontal line and one pixel interval; pixel interpolation means for combining the pixel data of the previous frame and the delayed pixel data of the previous frame from the first to third pixel delay means and producing at least one interpolation pixel data positioned between adjacent ones thereof, in accordance with the combined result; fourth pixel delay means for delaying pixel data of the present frame to produce rectangularly arranged pixel data of the present frame; a plurality of mean absolute difference detection means, each of the plurality of mean absolute difference detection means subtracting a corresponding one of the interpolation pixel data from the pixel interpolation means from a corresponding one of the rectangularly arranged pixel data of the present frame from the fourth pixel delay means to produce a mean absolute difference with respect to the corresponding pixel data of the present frame; and comparison means for comparing the mean absolute differences from the plurality of mean absolute difference detection means with one another and extracting a motion vector of a picture in accordance with the compared result.

BRIEF DESCRIPTION OF THE DRAWINGS

The above and other objects, features and advantages of the present invention will be more clearly understood from the following detailed description taken in conjunction with the accompanying drawings, in which:

FIG. 5 is a table illustrating output data from components in FIG. 1;

FIG. 9 is a table illustrating output data from components in FIG. 6.

DETAILED DESCRIPTION OF THE PREFERRED EMBODIMENTS

Figure 1:
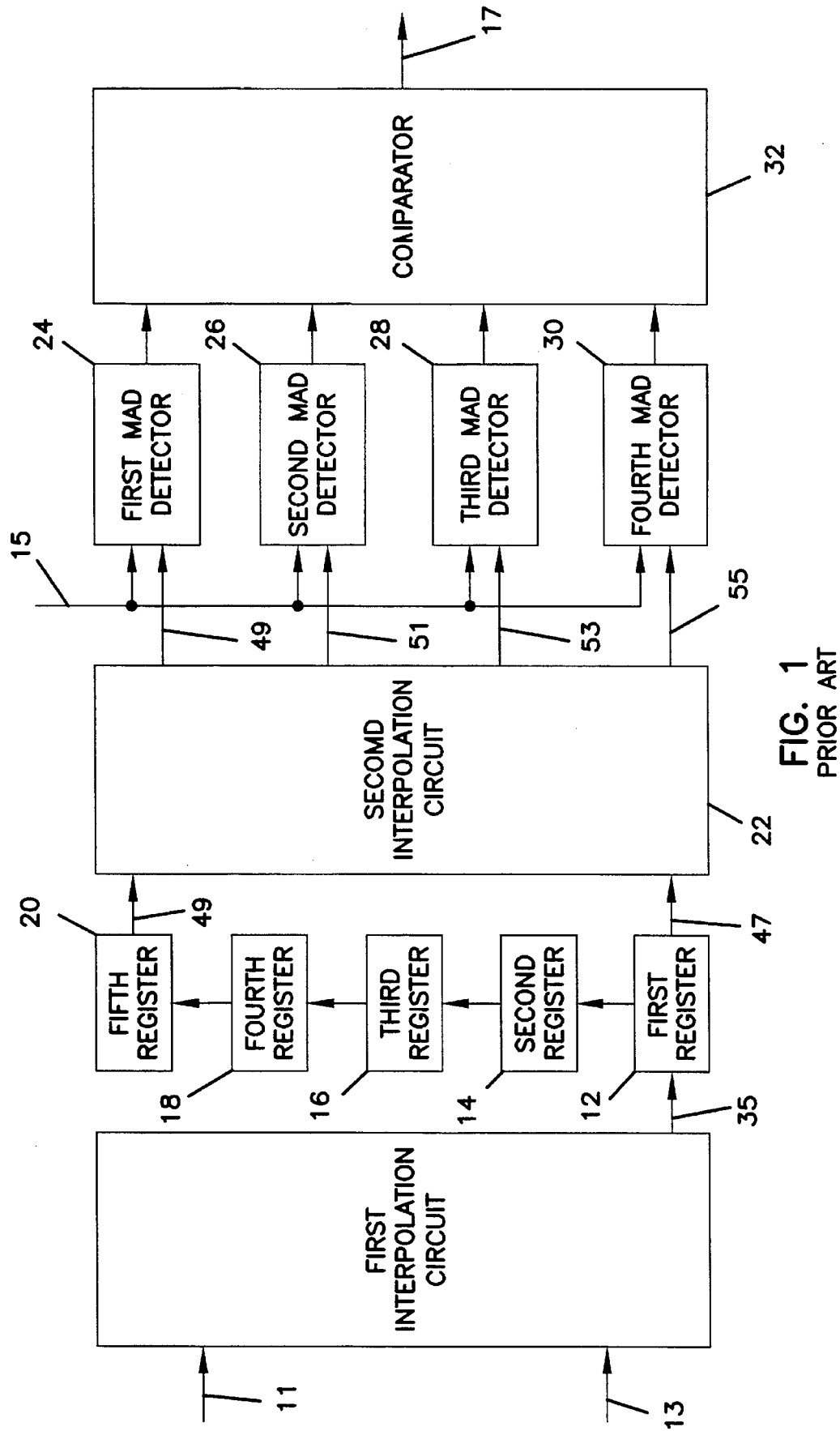
FIG. 1 is a block diagram of a conventional motion vector extractor.
Figure 2:
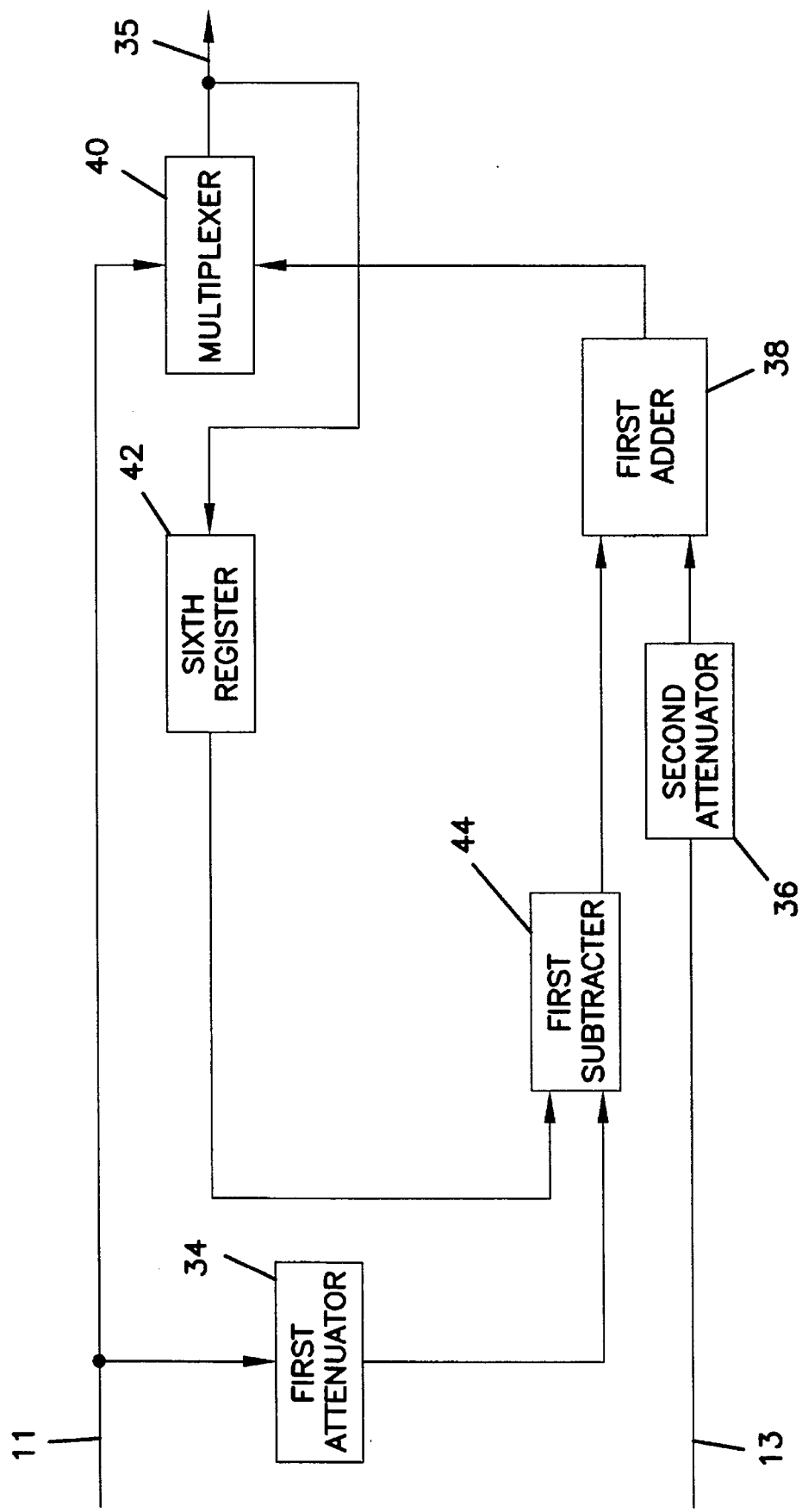
FIG. 2 is a detailed block diagram of a first interpolation circuit in FIG. 1.
Figure 3:
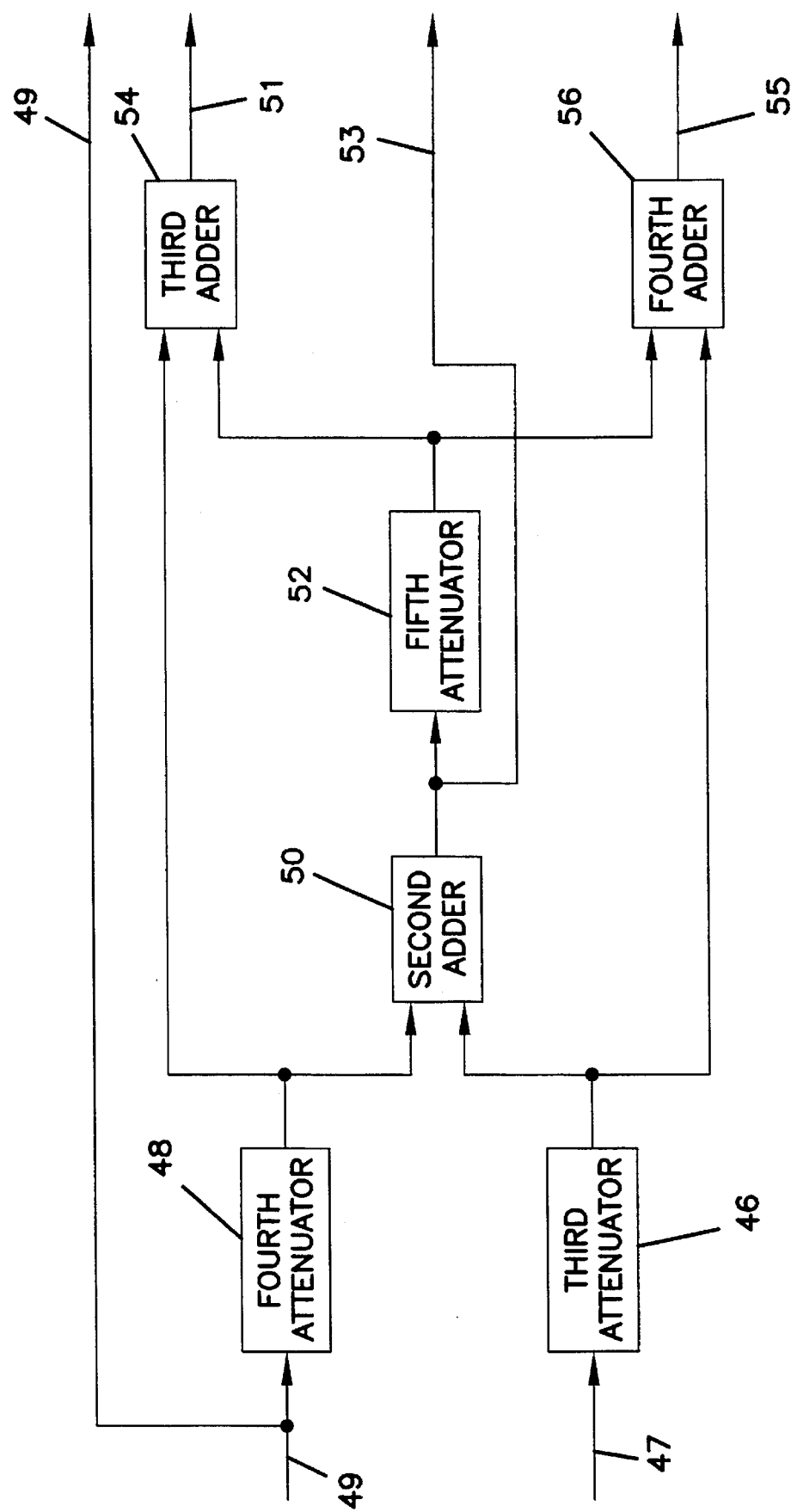
FIG. 3 is a detailed block diagram of a second interpolation circuit in FIG. 1.
Figure 4:
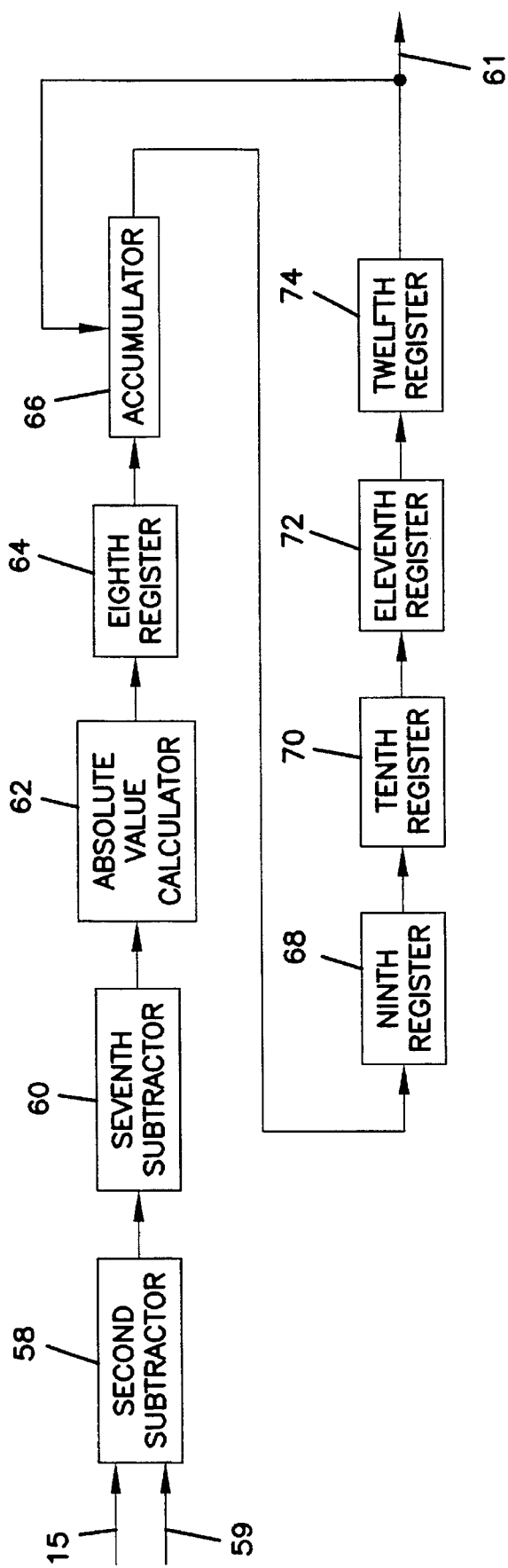
FIG. 4 is a detailed block diagram of each of the first to fourth MAD detectors in FIG. 1.
Figure 6:
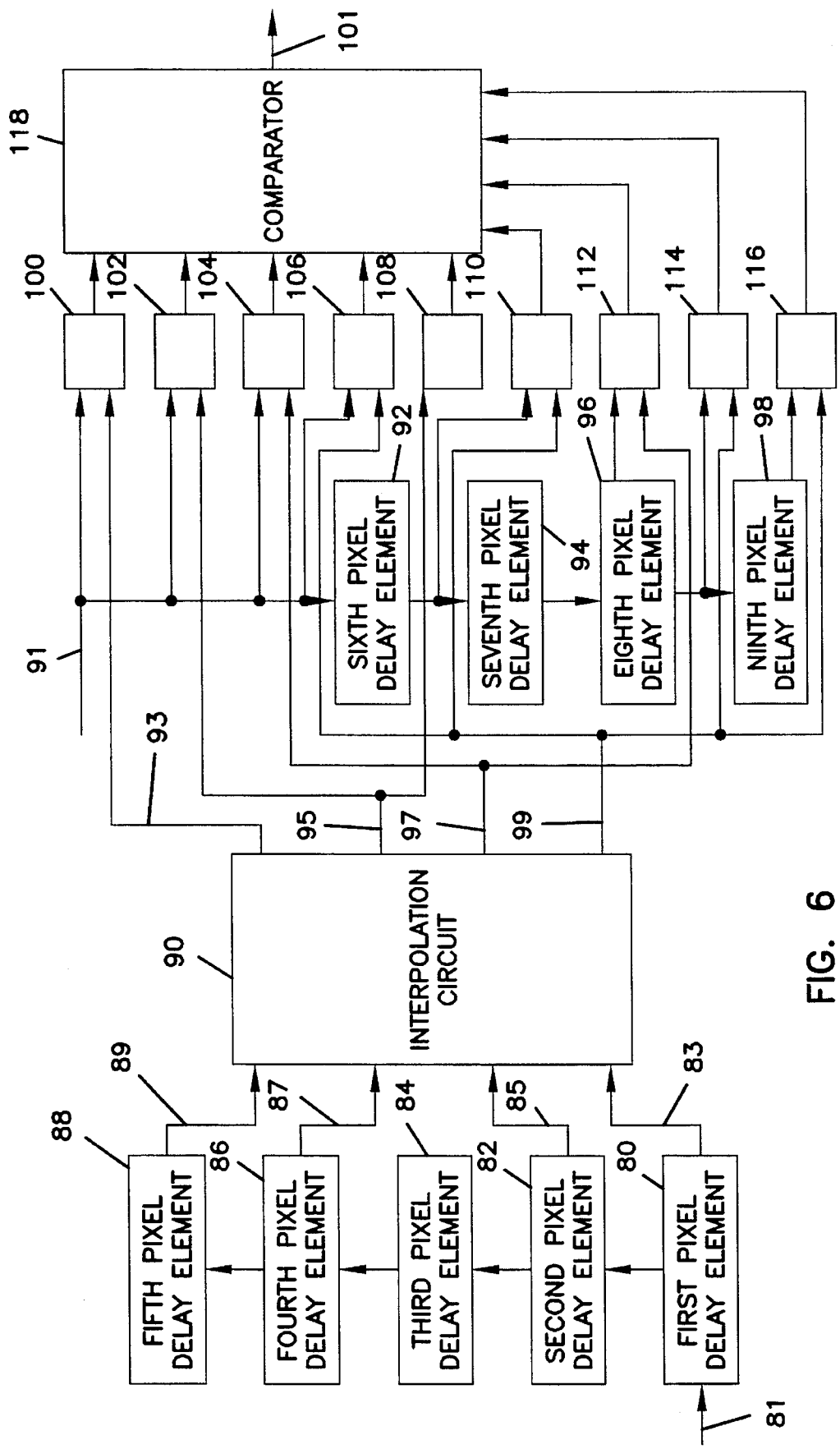
FIG. 6 is a block diagram of an improved motion vector extractor in accordance with an embodiment of the present invention.

Referring to FIG. 6, there is shown a block diagram of an improved motion vector extractor in accordance with an embodiment of the present invention. As shown in this drawing, the improved motion vector extractor comprises first to fifth pixel delay elements 80, 82, 84, 86 and 88 connected in series to a first input line 81. In accordance with the preferred embodiment of the present invention, the improved motion vector extractor is constructed to extract a motion vector in the unit of ½ pixel. It is assumed here that the improved motion vector extractor processes the previous frame data of a seek block with 5×5 pixels with respect to the present frame data of a reference block with 3 ×3 pixels.

The first pixel delay element 80 supplies pixel data b(i,j) of the previous frame from the first input line 81 to the second pixel delay element 82 and a first input line 83 of an interpolation circuit 90. The second pixel delay element 82 delays the pixel data b(i,j) of the previous frame from the first pixel delay element 80 by a one pixel interval and supplies the delayed pixel data b(i,j−1) of the previous frame to the third pixel delay element 84 and a second input line 85 of the interpolation circuit 90.

The fourth pixel delay element 86 produces pixel data b(i−1,j) of the previous frame delayed by a horizontal line interval (i.e., five-pixel interval) of the seek block from the pixel data b(i,j) of the previous frame. Then, the fourth pixel delay element 86 supplies the produced pixel data b(i−1,j) of the previous frame to the fifth pixel delay element 88 and a third input line 87 of the interpolation circuit 90. The fifth pixel delay element 88 produces pixel data b(i−1,j−1) of the previous frame delayed by a seek block horizontal line and one pixel interval (i.e., six-pixel interval) from the pixel data b(i,j) of the previous frame. Then, the fifth pixel delay element 88 supplies the produced pixel data b(i−1,j−1) of the previous frame to a fourth input line 89 of the interpolation circuit 90. The third pixel delay element 84 acts to delay the delayed pixel data b(i,j−1) of the previous frame from the second pixel delay element 82 by a three-pixel interval and supply the delayed pixel data of the previous frame to the fourth pixel delay element 86. The interpolation circuit 90 inputs the pixel data b(i,j) of the previous frame from the first pixel delay element 80 and the delayed pixel data b(i,j−1), b(i−1,j) and b(i−1,j−1) of the previous frame from the second, fourth and fifth pixel delay elements 82, 86 and 88 through its first to fourth input lines 83, 85, 87 and 89, respectively. Then, the interpolation circuit 90 combines the inputted pixel data b(i,j), b(i,j−1), b(i−1,j) and b(i−1,j−1) of the previous frame. As a result of the combination, the interpolation circuit 90 produces four interpolation pixel data $b_0^0(i,j)$, $b_{-1}^0(i,j)$, $b_0^{-1}(i,j)$ and $b_{-1}^{-1}(i,j)$. The four interpolation pixel data $b_0^0(i,j)$, $b_{-1}^0(i,j)$, $b_0^{-1}(i,j)$ and $b_{-1}^{-1}(i,j)$ are produced on the basis of the following equations (3) to (6):

$$b_0^0(i,j)=b(i,j) \tag{3}$$

$$b_{-1}^0(i,j)=[b(i,j)+b(i-1,j)]/2 \tag{4}$$

$$b_0^{-1}(i,j)=[b(i,j)+b(i,j-1)]/2 \tag{5}$$

$$b_{-1}^{-1}(i,j)=[b(i,j)+b(i-1,j)+b(i,j-1)+b(i-1,j-1)]/4 \tag{6}$$

The improved motion vector extractor further comprises first to ninth MAD detectors 100, 102, 104, 106, 108, 110, 112, 114 and 116, each of which inputs a corresponding one of the four interpolation pixel data $b_0^0(i,j)$, $b_{-1}^0(i,j)$, $b_0^{-1}(i,j)$ and $b_{-1}^{-1}(i,j)$ from the interpolation circuit 90, and a sixth pixel delay element 92 for inputting pixel data a(i,j) of the present frame from a second input line 91. The sixth pixel delay element 92 delays the pixel data a(i,j) of the present frame from the second input line 91 by the one pixel interval and supplies the delayed pixel data a(i,j−1) of the present frame to a seventh pixel delay element 94 and the fifth and sixth MAD detectors 108 and 110. The seventh pixel delay element 94 delays the delayed pixel data a(i,j−1) of the present frame from the sixth pixel delay element 92 again by the one pixel interval and thus produces pixel data a(i,j−2) of the present frame delayed by a two-pixel interval from the pixel data a(i,j) of the present frame. Then, the seventh pixel delay element 94 supplies the produced pixel data a(i,j−2) of the present frame to an eighth pixel delay element 96. The eighth pixel delay element 96 delays the delayed pixel data a(i,j−2) of the present frame from the seventh pixel delay element 94 again by the one pixel interval and thus produces pixel data a(i−1,j) of the present frame delayed by a horizontal line interval (i.e., three-pixel interval) of the reference block from the pixel data b(i,j) of the present frame. Then, the eighth pixel delay element 96 supplies the produced pixel data a(i,−1,j) of the present frame to the seventh and eighth MAD detectors 112 and 114 and a ninth pixel delay element 98. The ninth pixel delay element 98 delays the delayed pixel data a(i−1,j) of the present frame from the eighth pixel delay element 96 again by the one pixel interval and thus produces pixel data a(i−1,j−1) of the present frame delayed by a reference block horizontal line and one pixel interval (i.e., four-pixel interval) from the pixel data b(i,j) of the present frame. Then, the ninth pixel delay element 98 supplies the produced pixel data a(i−1,j−1) of the present frame to the ninth MAD detector 116.

The first MAD detector 100 detects an MAD between the pixel data a(i,j) of the present frame from the second input line 91 and the interpolation pixel data $b_0^0(i,j)$ from a first output line 93 of the interpolation circuit 90. Then, the first MAD detector 100 supplies the detected MAD to a comparator 118. The second to fourth MAD detectors 102, 104 and 106 are connected respectively to second to fourth output lines 95, 97 and 99 of the interpolation circuit 90 to operate in a similar manner to the first MAD detector 100. Namely, each of the second to fourth MAD detectors 102, 104 and 106 detects an MAD between a corresponding one of the interpolation pixel data $b_{-1}^0(i,j)$, $b_0^{-1}(i,j)$ and $b_{-1}^{-1}(i,j)$ from the interpolation circuit 90 and the pixel data a(i,j) of the present frame from the second input line 91. Then, the second to fourth MAD detectors 102, 104 and 106 supply the detected MADs to the comparator 118, respectively.

The fifth to ninth MAD detectors 108, 110, 112, 114 and 116 are operated in a similar manner to the first to fourth MAD detectors 100, 102, 104 and 106 to detect respective MADs. Namely, the fifth MAD detector 108 detects an MAD between the pixel data a(i,j−1) of the present frame delayed by the one pixel interval, interval, supplied from the sixth pixel delay element 92, and the interpolation pixel data $b_{-1}^0(i,j)$ supplied from the second output line 95 of the interpolation circuit 90. The sixth MAD detector 110 detects an MAD between the pixel data a(i,j−1) of the present frame delayed by the one pixel interval, supplied from the sixth pixel delay element 92, and the interpolation pixel data $b_{-1}^{-1}(i,j)$ supplied from the fourth output line 99 of the interpolation circuit 90. The seventh MAD detector 112 detects an MAD between the pixel data a(i−1,j) of the present frame delayed by the horizontal line interval of the reference block, supplied from the eighth pixel delay element 96, and the interpolation pixel data $b_0^{-1}(i,j)$ supplied from the third output line 97 of the interpolation circuit 90. The eighth MAD detector 114 detects an MAD between the pixel data a(i−1,j) of the present frame delayed by the horizontal line interval of the reference block, supplied from the eighth pixel delay element 96, and the interpolation pixel data $b_{-1}^{-1}(i,j)$ supplied from the fourth output line 99 of the interpolation circuit 90. Finally, the ninth MAD detector 116 detects an MAD between the pixel data a(i−1,j−1) of the present frame delayed by the reference block horizontal line and one pixel interval, supplied from the ninth pixel delay element 98, and the interpolation pixel data $b_{-1}^{-1}(i,j)$ supplied from the fourth output line 99 of the interpolation circuit 90.

The comparator 118 compares the nine MADs from the first to ninth MAD detectors 100, 102, 104, 106, 108, 110, 112, 114 and 116 with one another. As a result of the comparison, the comparator 118 selects a minimum one of the nine MADs and outputs the selected MAD as a motion vector through an output line 101.

Figure 7:
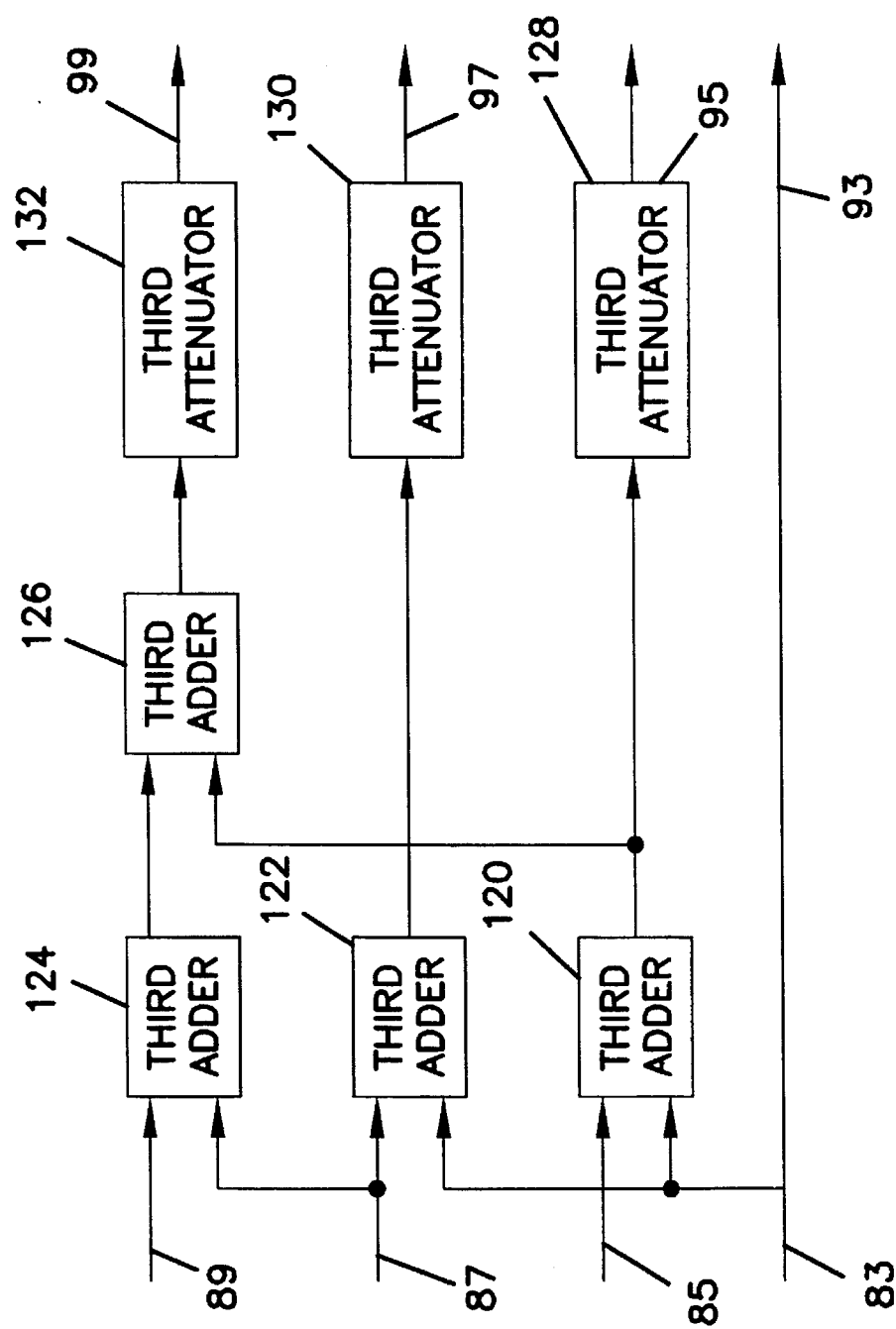
FIG. 7 is a detailed block diagram of an interpolation circuit in FIG. 6.

Referring to FIG. 7, there is shown a detailed block diagram of the interpolation circuit 90 in FIG. 6. As shown in this drawing, the interpolation circuit 90 includes a first adder 120 for inputting the pixel data b(i,j) of the previous frame supplied through the first input line 83 from the first pixel delay element 80 in FIG. 6 and the pixel data b(i,j−1) of the previous frame delayed by the one pixel interval, supplied through the second input line 85 from the second pixel delay element 82 in FIG. 6. The first adder 120 adds the inputted two pixel data b(i,j) and b(i,j−1) and supplies the resultant pixel data [b(i,j)+b(i,j−1)] to a first attenuator 128. The first attenuator 128 attenuates the pixel data [b(i,j)+b(i,j−1)] from the first adder 120 in such a manner that it can have a ½ amplitude. Then, the first attenuator 128 supplies the attenuated pixel data [b(i,j)+b(i,j−1)]/2 as the interpolation pixel data $b_{-1}{}^0$(i,j) to the second and fifth MAD detectors 102 and 108 in FIG. 6 through the second output line 95.

The interpolation circuit 90 further includes a second adder 122 for inputting the pixel data b(i,j) of the previous frame supplied through the first input line 83 from the first pixel delay element 80 in FIG. 6 and the pixel data b(i−1,j) of the previous frame delayed by the one horizontal line interval (i.e., three-pixel interval), supplied through the third input line 87 from the fourth pixel delay element 86 in FIG. 6. The second adder 122 adds the inputted two pixel data b(i,j) and b(i−1,j) and supplies the resultant pixel data [b(i,j)+b(i−1,j)] to a second attenuator 130. The second attenuator 130 attenuates the pixel data [b(i,j)+b(i−1,j)] from the second adder 122 in such a manner that it can have a ½ amplitude. Then, the second attenuator 130 supplies the attenuated pixel data [b(i,j)+b(i−1,j)]/2 as the interpolation pixel data $b_0{}^{-1}$(i,j) to the third and seventh MAD detectors 104 and 112 in FIG. 6 through the third output line 97.

The interpolation circuit 90 further includes a third adder 124 for inputting the pixel data b(i−1,j) of the previous frame delayed by the one block horizontal line interval, supplied through the third input line 87 from the fourth pixel delay element 86 in FIG. 6, and the pixel data b(i−1,j−1) of the previous frame delayed by the one block horizontal line and one pixel interval (i.e., four-pixel interval), supplied through the fourth input line 89 from the fifth pixel delay element 88 in FIG. 6. The third adder 124 adds the inputted two pixel data b(i−1,j) and b(i−1,j−1) and supplies the resultant pixel data [b(i−1,j)+b(i−1,j−1)] to a fourth adder 126 which also inputs the pixel data [b(i,j)+b(i,j−1)] from the first adder 120. The fourth adder 126 adds the pixel data [b(i,j)+b(i,j−1)] from the first adder 120 to the pixel data [b(i−1,j)+b(i−1,j−1)] from the third adder 124 and supplies the resultant pixel data [b(i−1,j)+b(i−1,j−1)+b(i,j)+b(i,j−1)] to a third attenuator 132. The third attenuator 132 attenuates the pixel data [b(i−1,j)+b(i−1,j−1)+b(i,j)+b(i,j−1)] from the fourth adder 126 in such a manner that it can have a ½ amplitude. Then, the third attenuator 132 supplies the attenuated pixel data [b(i−1,j)+b(i−1,j−1)+b(i,j)+b(i,j−1)]/2 as the interpolation pixel data $b_{-1}{}^{-1}$(i,j) to the fourth, sixth, eighth and ninth MAD detectors 106, 110, 114 and 116 in FIG. 6 through the fourth output line 99.

Figure 8:
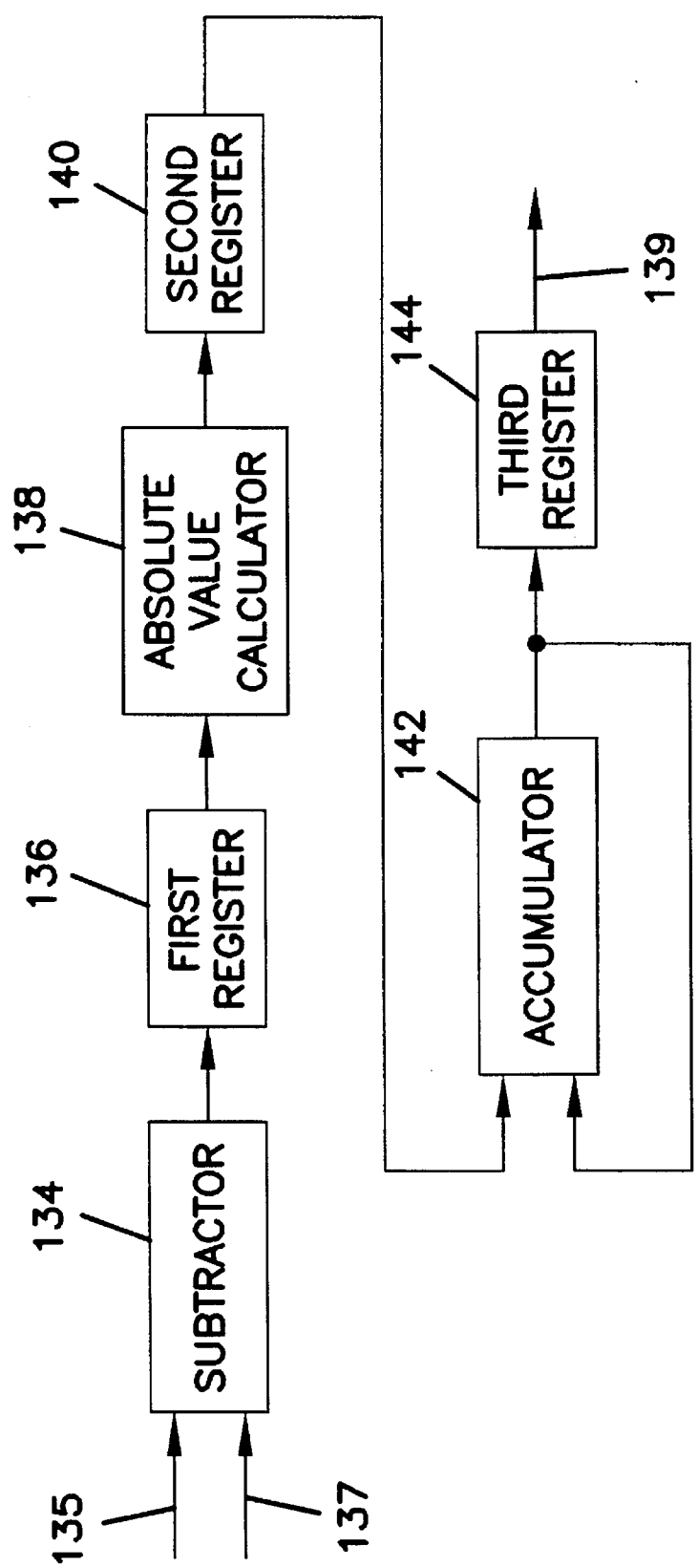
FIG. 8 is a detailed block diagram of each of the first to ninth MAD detectors in FIG. 6.

Referring to FIG. 8, there is shown a detailed block diagram of each of the first to ninth MAD detectors 100, 102, 104, 106, 108, 110, 112, 114 and 116 in FIG. 6. As shown in this drawing, the MAD detector includes a subtracter 134 for inputting the interpolation pixel data $b_l{}^k$(i,j) from a first input line 135 and the pixel data a(i,j) of the present frame from a second input line 137. The first input line 135 is connected to the first, second, third or fourth output line 93, 95, 97 or 99 of the interpolation circuit 90 in FIGS. 6 and 7 to input the corresponding interpolation pixel data $b_l{}^k$(i,j) (i.e., $b_0{}^0$(i,j), $b_{-1}{}^0$(i,j), $b_0{}^{-1}$(i,j) or $b_{-1}{}^{-1}$(i,j)) therefrom. The second input line 137 is connected to the second input line 91, an output line of the sixth pixel delay element 92, an output line of the eighth pixel delay element 96 or an output line of the ninth pixel delay element 98 in FIG. 6 to input therefrom the pixel data a(i,j) of the present frame, the pixel data a(i,j−1) of the present frame delayed by the one pixel interval, the pixel data a(i−1,j) of the present frame delayed by the reference block horizontal line interval (i.e., three-pixel interval) or the pixel data a(i−1,j−1) of the present frame delayed by the reference block horizontal line and one pixel interval (i.e., four-pixel interval). For the convenience of the description, it is here assumed that the second input line 137 inputs the pixel data a(i,j) of the present frame from the second input line 91 in FIG. 6, not delayed.

The subtracter 134 subtracts the interpolation pixel data $b_1{}^k$(i,j) from the pixel data a(i,j) of the present frame. As a result of the subtraction, the subtracter 134 detects a difference between the pixel data a(i,j) of the present frame and the interpolation pixel data $b_1{}^k$(i,j). Then, the subtracter 134 supplies the detected difference to a first register 136. The first register 136 temporarily stores the inter-pixel difference from the subtracter 134 and supplies the temporarily stored inter-pixel difference to an absolute value calculator 138. In result, the first register 136 acts to safely transfer the inter-pixel difference from the subtracter 134 to the absolute value calculator 138. The absolute value calculator 138 obtains an absolute value of the inter-pixel difference from the first register 136 and supplies the obtained absolute value to a second register 140.

The MAD detector further includes an accumulator 142 for inputting the absolute value of the inter-pixel difference from the second register 140. The accumulator 142 adds the absolute value of the inter-pixel difference from the second register 140 to the present MAD fed back from its output line and transfers the resultant MAD to a third register 144. The third register 144 transfers the MAD from the accumulator 142 to the comparator 118 in FIG. 6 through an output line 139.

FIG. 9 is a table illustrating the output data from the interpolation circuit 90 and the MADs from the first to ninth MAD detectors 100, 102, 104, 106, 108, 110, 112, 114 and 116 with respect to the 5×5 pixel data from the first input line 81 in FIG. 6. As seen from this drawing, the improved motion vector extractor performs the calculating operation once to extract the motion vector.

As apparent from the above description, the improved motion vector extractor of the present invention has the effect of shortening the motion vector extracting time. Also, the improved motion vector extractor of the present invention can produce the interpolation pixel data without resorting to parallel MAD processing as discussed in the Description of the Prior Art. Therefore, the circuit can be simplified in construction.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An improved motion vector extractor comprising:

first pixel delay means for delaying pixel data of the previous frame by a one pixel interval;

second pixel delay means for delaying the pixel data of the previous frame by a horizontal line interval of a seek block;

third pixel delay means for delaying the pixel data of the previous frame by a seek block horizontal line and one pixel interval;

pixel interpolation means for combing the pixel data of the previous frame and the delayed pixel data of the previous frame from said first to third pixel delay means and producing at least one interpolation pixel data positioned between adjacent ones thereof, in accordance with the combined result;

fourth pixel delay means for delaying pixel data of the present frame to produce rectangularly arranged pixel data of the present frame;

a plurality of mean absolute difference detection means, each of said plurality of mean absolute difference detection means subtracting a corresponding one of the interpolation pixel data from said pixel interpolation means from a corresponding one of the rectangularly arranged pixel data of the present frame from said fourth pixel delay means to produce a mean absolute difference with respect to the corresponding pixel data of the present frame; and comparison means for comparing the mean absolute differences from said plurality of mean absolute difference detection means with one another and extracting a motion vector of a picture in accordance with the compared result.

* * * * *